(12) United States Patent
Schulze-Wehninck et al.

(10) Patent No.: US 11,440,498 B2
(45) Date of Patent: Sep. 13, 2022

(54) AIRBAG COVER

(71) Applicant: K.L. KASCHIER-UND LAMINIER GMBH, Bad Bentheim-Gildehaus (DE)

(72) Inventors: Rembert Schulze-Wehninck, Tutzing (DE); Albert Roring, Gronau-Epe (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 16/758,087

(22) PCT Filed: May 17, 2019

(86) PCT No.: PCT/EP2019/000151
§ 371 (c)(1),
(2) Date: Apr. 22, 2020

(87) PCT Pub. No.: WO2020/038594
PCT Pub. Date: Feb. 27, 2020

(65) Prior Publication Data
US 2021/0370862 A1    Dec. 2, 2021

(30) Foreign Application Priority Data

Aug. 24, 2018  (DE) .......................... 102018006706.9

(51) Int. Cl.
*B60R 21/215* (2011.01)
*B60R 21/2165* (2011.01)

(52) U.S. Cl.
CPC ........ *B60R 21/215* (2013.01); *B60R 21/2165* (2013.01); *B60R 2021/21537* (2013.01)

(58) Field of Classification Search
CPC .................. B60R 2021/215; B60R 21/215
See application file for complete search history.

(56) References Cited

U.S. PATENT DOCUMENTS 6,089,642 A      7/2000 Davis, Jr.
6,863,358 B2 *   3/2005 Beyer ..................... E06B 3/482
                                                    312/297
(Continued)

FOREIGN PATENT DOCUMENTS

DE   102010012136 A    9/2011
DE   102007022620 B4 * 8/2013 ........... B60R 21/207
(Continued)

*Primary Examiner* — Nicole T Verley
(74) *Attorney, Agent, or Firm* — Andrew Wilford

(57) ABSTRACT

The invention relates to a covering assembly over the chute channel of an airbag comprising having an airbag through-opening, which is closed by an airbag flap and an, in particular sprayed-on, covering made of plastic and secured over the airbag flap, wherein the covering has at least one target break line at the edge of the airbag flap in order to enable the unfolding of the airbag cushion, and wherein the airbag flap is connected via a joining point to a flap support wall in a moulded manner, which is in contact with the inner side of the chute channel wall in a secured manner, wherein the inner-side end of the flap support wall is bent outwards with a V-shaped or U-shaped cross-section, and with these hook-shaped bent region, same is inserted in the plastic material of the chute channel wall or engages under the lower end of the chute channel wall.

5 Claims, 1 Drawing Sheet

(56) References Cited

U.S. PATENT DOCUMENTS

| | | | |
|---|---|---|---|
| 7,552,940 B2 | 6/2009 | Lindemann | |
| 7,669,884 B2 * | 3/2010 | Kikuchi | B60R 21/36 |
| | | | 280/728.3 |
| 9,065,327 B2 | 5/2015 | Hampo | |
| 9,045,106 B2 * | 6/2015 | Pauthier | B29C 45/14 |
| 9,421,936 B2 * | 8/2016 | Sugawara | B29C 66/81431 |
| 9,598,039 B2 | 3/2017 | Knauf | |
| 10,640,070 B2 * | 5/2020 | An | B60R 21/215 |
| 10,981,532 B2 * | 4/2021 | Stroebe | B60R 21/215 |
| 11,173,862 B2 * | 11/2021 | Lee | B60R 21/215 |
| 2005/0140121 A1 | 6/2005 | Hayashi | |
| 2014/0117649 A1 | 5/2014 | Hoeing | |
| 2014/0375029 A1 * | 12/2014 | Pauthier | B29C 45/14 |
| | | | 280/728.3 |
| 2015/0041081 A1 * | 2/2015 | Banu | B27N 3/12 |
| | | | 162/13 |
| 2015/0151706 A1 * | 6/2015 | Burry | B60R 21/2165 |
| | | | 280/728.3 |
| 2018/0194319 A1 | 7/2018 | Lesnik et al. | |

FOREIGN PATENT DOCUMENTS

| | | | | |
|---|---|---|---|---|
| DE | 102012004928 A1 * | 9/2013 | | B60R 21/207 |
| DE | 102012109350 A | 8/2014 | | |
| DE | 102018208562 A1 * | 12/2019 | | B60R 21/2165 |
| DE | 102019133499 A1 * | 6/2021 | | B60R 21/215 |
| EP | 1393994 A | 3/2004 | | |
| EP | 3345794 A1 * | 7/2018 | | B29C 45/14786 |
| FR | 2942436 A1 * | 8/2010 | | B60R 21/215 |
| GB | 2517074 A * | 7/2013 | | |
| JP | 2006205837 A * | 8/2006 | | |
| WO | WO-2021170491 A * | 2/2021 | | |

\* cited by examiner

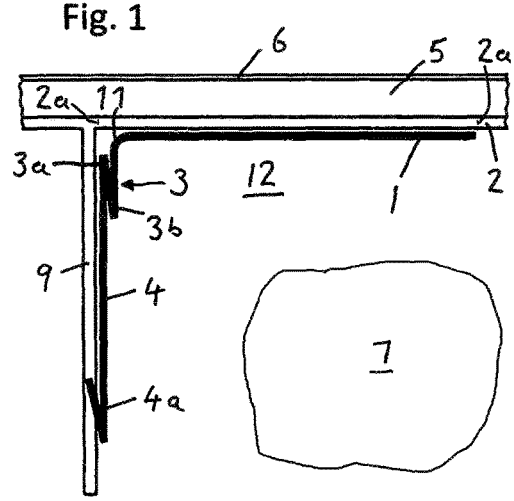
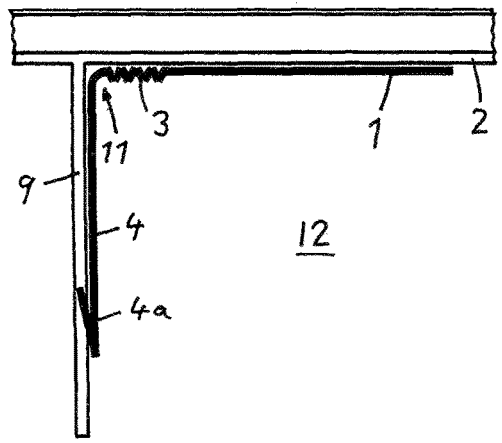
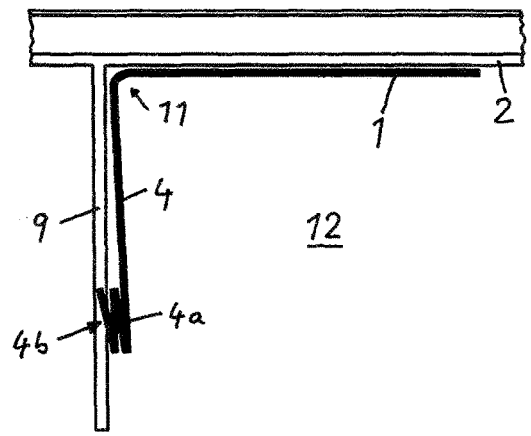
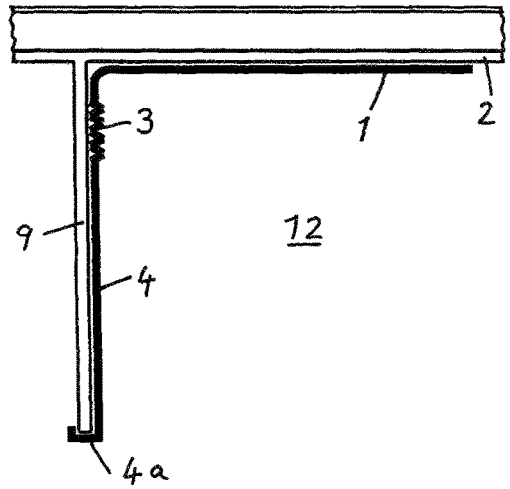
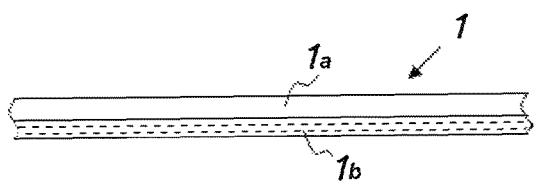

AIRBAG COVER

CROSS REFERENCE TO RELATED APPLICATIONS

This application is the US-national stage of PCT application PCT/EP2019/000151 filed 17 May 2019 and claiming the priority of German patent application 102018006706.9 itself filed 24 Aug. 2018.

FIELD OF THE INVENTION

The invention relates to a cover over the launch pocket of airbag assembly comprising an airbag hole that is closed by an outer flap and an, in particular molded, cover element made of plastic and secured over the outer flap, wherein the cover element has at least one target break line at an edge of the outer flap in order to enable unfolding of the airbag cushion, and wherein the outer flap is joined unitarily by a hinge element to an inner flap that is in contact with an inner face of the launch pocket wall in a secured manner.

A cover of this type is known from EP 2 727 775 [US 2014/0117649]. In the case of airbags it should be ensured that the outer flap is retained securely during unfolding of the airbag cushion and is not released to fly into the passenger compartment.

BACKGROUND OF THE INVENTION

An object of the invention is to create a secure retention for the outer flap of airbag assembly.

SUMMARY OF THE INVENTION

This object is achieved according to the invention in that the inner end of the inner flap is bent outward with a V-shaped or U-shaped cross section and is inserted with this cross-sectionally hook-shaped bent region into the plastic material of the launch pocket wall or engages below a lower edge of the launch pocket wall.

This ensures that the inner flap on which the outer flap is molded is retained securely on the launch pocket wall, so that the outer flap cannot come loose.

Furthermore, the outer flap should have an additional movement path, without coming loose from the airbag installation. In this connection it is proposed that the inner end of the bent region of the inner flap is bent again with a V-shaped or U-shaped cross section and thus the inner end of the inner flap has a Z-shaped cross section. Furthermore, the inner, in particular lower end of the inner flap has a material reservoir in the form of a fold or corrugation from which the bent region is bent away. In this connection it is also proposed that the outer flap and/or the inner flap has a material reservoir in the form of a fold or corrugation near the hinge element.

High material strength is achieved if the outer flap and the inner flap are made from a composite material having at least one layer consisting of plastic strips or fibers, in particular made from thermoplastic polypropylene or polyester and at least one plastic layer melted thereon. In this case the plastic strips or fibers can form a fabric.

BRIEF DESCRIPTION OF THE DRAWING

Embodiments of the airbag cover according to the invention are illustrated schematically in the drawings in cross section and are described in greater detail below. In the drawings:

FIG. 1 shows an inner flap retaining an outer flap with a hook-shaped inner end and folds near the hinge element, FIG. 2 shows an inner flap retaining an outer flap with a hook-shaped inner end and folds or corrugation of the outer flap at the hinge element, FIG. 3 shows an inner flap retaining an outer flap with a folded hook-shaped inner end, FIG. 4 shows an inner flap retaining an outer flap with an inner end bent in a U shape below the lower end of the launch pocket wall and with folds or corrugation near the hinge element, and FIG. 5 is a large-scale sectional view of a detail of the invention.

SPECIFIC DESCRIPTION OF THE INVENTION

The airbag assembly has a compartment 12 that accommodates an impact cushion 7 and forms the launch pocket that is delimited by launch pocket walls 9 and closed by a cover element 2 that has target break lines 2a. The cover element 2 forms an airbag hole when, after triggering of the impact cushion 7, the cover element 2 tears along the target break lines and flaps up toward the exterior. In this case, the door formed by the cover element 2 remains attached to the rest of the cover element by an edge that forms a joint 11.

The cover element 2 is covered by a foam layer 5 having an outer face bearing a decorative surface material.

At least one outer flap 1 is fastened to the underside of the cover element 2, the cover element 2 being integrally molded onto the outer flap 1. The material of the outer flap 1 and the method of production are described in EP 2 727 775.

As shown in FIG. 1, the airbag hole is closed by a single outer flap 1 that has the hinge element 11. However, two outer flaps can also be arranged with hinge elements on opposing sides. The outer flap(s) is/are in each case joined unitarily by the hinge element 11 with an inner flap 4 that extends into the interior of the compartment 12 and thus of the launch pocket. In this case the inner flap 4 is on the inner surface of the pocket wall 9 and is secured thereto. As shown in FIG. 5, the outer flap 1 (like the inner flap 4) is made of a laminate comprised of a layer 1a of plastic melted onto a fabric layer of plastic strips or fibers made from thermoplastic polypropylene or polyester.

As illustrated in FIG. 1, the lower inner end of the inner flap 4 is bent outward with a V-shaped or U-shaped cross section and is inserted with this cross-sectionally hook-shaped region 4a into the plastic material of the launch pocket wall 9. Alternatively the V-shaped or U-shaped bent end or region 4a engages below the lower edge of the launch pocket wall 9 as illustrated in FIG. 4.

In the embodiment illustrated in FIG. 3, the outer end of the bent region 4a is bent again with a V-shaped or U-shaped cross section and thus the inner end of the inner flap 4 has a Z-shaped cross section. This produces a flexible region. Thus the inner, in particular lower end of the inner flap 4 has a material reservoir in the form of a fold or corrugation 3 from which the bent region 2a is bent away.

Near the hinge element 11 the outer flap (FIG. 2) and/or the inner flap 4 (FIGS. 1 and 4) has a flexible region in the form of a fold or corrugation 3, which as material-providing regions allow lengthening or stretching of the outer flap outward while the airbag cushion pivots out.

In all the above descriptions and illustrations and details in the claims it should be noted that the hinge elements, folds, corrugations and bends preferably extend over the entire length of the respective parts or objects.

The invention claimed is:

1. An airbag assembly comprising;
a launch pocket defined by walls made of plastic and delimiting an airbag hole;
an outer flap closing the hole;
an airbag in the pocket;
a cover element made of plastic, secured over the outer flap, and having at least one target break line forming the hole at an edge of the outer flap in order to enable unfolding of the airbag cushion and deployment through the hole;
an inner flap in secure contact with an inner face of one of the launch pocket walls and having an inner end; and
a hinge element unitarily joining the outer flap to the inner flap, the inner end of the inner flap being bent outward with a V-shaped cross section to form a cross-sectionally hook-shaped region that is embedded in the plastic of the one launch pocket wall without penetrating through the one launch pocket wall.

2. The airbag assembly according to claim 1, wherein the inner end of a bent region of the inner flap is bent again with a V-shaped or U-shaped cross section and thus the inner end of the inner flap has a Z-shaped cross section.

3. The airbag assembly according to claim 2, wherein the inner end of the inner flap has a material reservoir in the form of a fold or corrugation from which the bent region is bent away.

4. The airbag assembly according to claim 1, wherein the outer flap and the inner flap are made from a composite material having at least one layer of plastic strips or fibers made from thermoplastic polypropylene or polyester and at least one plastic layer melted thereon.

5. The airbag assembly according to claim 4, wherein the plastic strips or fibers form a fabric.

* * * * *